United States Patent Office 3,637,552
Patented Jan. 25, 1972

3,637,552
FLAME RETARDANT, ANTISTATIC POLYMERS
Roland J. Bryan, Jr., Pensacola, Fla., assignor to
Monsanto Company, St. Louis, Mo.
No Drawing. Filed July 8, 1970, Ser. No. 53,296
Int. Cl. C08g *51/54;* C08k *1/66*
U.S. Cl. 260—18 R      10 Claims

ABSTRACT OF THE DISCLOSURE

The flame-resistance and antistatic properties of fabrics formed from thermoplastic polymer filaments containing from 2 to 15% by weight, based on the weight of polymer, of a polyalkoxylated compound are greatly improved by incorporating into said filaments in combination with the polyalkoxylated compound from 2 to 15% by weight, based on the weight of the polymer of an alkyl phosphonium phosphate of the formula $$\left[\begin{array}{c} R \\ | \\ R-P-R' \\ | \\ R \end{array}\right]^{+} \ominus \begin{array}{c} O \\ \| \\ O-P-OR' \\ | \\ OR' \end{array}$$

wherein each R and R' is an alkyl radical having from 1 to 20 carbon atoms.

BACKGROUND OF THE INVENTION

The build-up of charges of static electricity on the surface of fabrics made from thermoplastic polymer yarns, e.g. polyamide yarns, is recognized in the art. It is also recognized that these yarns can be rendered static-resistant by incorporating into the polymer, prior to the forming of the yarns, a compound which may be characterized as a polyalkoxylated compound. These compounds are in general prepared by reacting an alkylene oxide, such as ethylene oxide, with a chain initiating compound containing one or more reactive hydrogen atoms, such as alcohol, polyol or amine. In some instances one or more of the terminal hydroxy groups of the resulting polyalkoxylated compound are capped with ether end groups. As used herein, the term polyalkoxylated compound designates a compound of the type just described, wherein its molecule contains at least 50 mole percent of recurring alkoxy units, i.e., —OR"— groups, wherein R" is a $C_2$ to $C_4$ alkylene group. Representative compounds of this type are described in U.S. Pat. 3,329,557, issued July 4, 1967 to Eugene E. Magat et al.; 3,388,104, issued June 11, 1968 to Lawrene W. Crovatt, Jr., and 3,475,898, issued Nov. 4, 1969 to Eugene E. Magat et al.

Unfortunately, the incorporation of polyalkoxylated compounds into thermoplastic polymers, such as polyamides, increases the flammability thereof. Recently, the Government has taken a firm position on updating the standards for flameproofing of a number of fabrics, particularly, fabrics used for interior furnishings (carpets) and wearing apparel. This trend is expressed in an article appearing in the "Textile World," October 1969, pages 102 and 103. Accordingly, there is a need in the art to provide an additive which, when incorporated into a thermoplastic polymer in combination with a polyalkoxylated compound, will impart to the polymer an acceptable level of flame retardancy and yet will not adversely affect the antistatic properties of the polymer or other properties thereof.

Numerous compounds have been described in the literature which to some degree impart flame-retardant properties to polymers. Many of these compounds, however, are unsatisfactory for incorporation into polymers that are subsequently melt-spun into filaments due to the processing conditions involved, for example, the high temperatures encountered in the melt spinning of the polymer tend to decompose the compounds causing discoloration of the polymer and general reduction in the physical properties thereof. Also, decomposition of the compounds results in loss of the flame-retardant qualities thereof and in some instances adversely affects the processing of the polymer into filaments. Another factor which must be considered is the compatibility of the flame-retardant additive with the polyalkoxylated compound, polymer and other additives present in the polymer composition, such as delustrants, stabilizers and the like.

An object of the present invention is to provide a class of compounds which, when incorporated into a fiber-forming thermoplastic polymer in combination with a polyalkoxylated compound, imparts flame-retardant properties thereto and improves the antistatic properties thereof.

Another object of the invention is to provide articles, such as filaments and films, shaped from thermoplastic polymers containing the compounds described in the preceding paragraph.

Other objects of the invention will become apparent from the following descriptions thereof.

SUMMARY OF THE INVENTION

The objects of the invention are accomplished by uniformly incorporating (dispersing) into a linear, fiber-forming, synthetic thermoplastic polymer a synergistic combination or mixture of a polyalkoxylated compound and an alkyl phosphonium phosphate, wherein each component of the mixture is present in an amount ranging from about 2% to 15% by weight, based on the weight of the polymer and wherein the phosphate is of the Formula I.

$$\left[\begin{array}{c} R \\ | \\ R-P-R' \\ | \\ R \end{array}\right]^{+} \ominus \begin{array}{c} O \\ \| \\ O-P-OR' \\ | \\ OR' \end{array}$$

in which each R and R' is an alkyl radical having from 1 to 20 carbon atoms. The mixture may be incorporated into the polymer by adding it to and mixing it with the polymer while the polymer is in the molten state. When the polymer is to be melt-spun into filaments, the mixture or individual components thereof are conveniently added to the molten polymer just prior to the spinning thereof.

The phosphates of Formula I are easily prepared according to conventional techniques, for example, by bringing together a trialkylphosphine and a trialkylphosphate and heating. Polymers modified in accordance with the present invention have flame-retardant and antistatic properties superior to either the polymer itself, the polymer containing only the alkoxylated compound or the polymer containing only the alkyl phosphonium phosphate. In fact, the phosphate alone offers little flame-resistant protection to the polymer and the alkoxylated compound renders the polymer more flammable. Unexpectedly, the polyalkoxylated compound and the phosphate in combination cooperate synergistically within the polymer to greatly improve the flame-retardant properties thereof while also providing greater antistatic protection than is obtainable with the polyalkoxylated compound by itself. Additionally, the presence of the phosphate in polymers containing a polyethoxylated compound improves the heat stability thereof.

DESCRIPTION OF THE PREFERRED EMBODIMENTS

The following examples are given to further illustrate the invention. In the examples fabrics knitted from various yarns identified therein were tested to determine in some instances flammability of the yarns and in other instances antistatic properties of the yarns.

In determining the flammability of the yarns, samples are prepared by plying together a sample yarn and a fiber glass yarn of approximately the same denier and made from spun staple glass fibers and then knitting the resulting plied yarn into a tube having a diameter of about four inches. The purpose of the fiber glass yarn is to provide a non-burnable support for the sample yarn during testing. The tubular fabrics are placed in a carbon tetrachloride bath to extract any finish present on the yarns and then air dried for 18 to 24 hours at ambient temperatures. The tubular fabrics are then cut to form rectangles, which are each mounted into a flammability tester, identical to the tester shown in FIG. 1 under ASTM Designation: D1230–61 (page 261). The mounted fabrics are then tested according to the procedure outlined on pages 260 and 261 of ASTM Designation: D1230–61. In brief, the test consists of mounting test fabrics at an angle of inclination of 45° in the tester. The tester automatically ignites the test fabrics near the lower edge thereof by application of a flame on the fabrics for 3 seconds. At the upper edge of each fabric there is a thread passing through the fabric and attached to a weight. When the thread burns, the weight falls. The period of time required after the 3 second ignition period for the weight to fall is recorded. In these tests the longer the period of time required for the weight to fall, the greater the degree of flame-resistant property.

In determining the static build-up, tubular fabrics are knitted from the yarn. The knit fabrics are then washed a specified number of times, using commercially available detergent and rinsed a specified number of times in a conventional automatic washer and then tumble dried in a conventional electric drier. The fabrics are then conditioned for from 4 to 6 days at 40% relative humidity at 73° F. The testing was carried out on a dynamic static tester similar to that described in vol. 40, American Dyestuff Reporter, pp. 164–168 (1951). In brief, the test is carried out by attaching a test fabric to an aluminum cylinder which is rotated at approximately 300 r.p.m. The fabric is then electrostatically charged by allowing it to rub against another similar fabric surface for one minute. Then, while continuing to rotate the cylinder, the period of time (in seconds) for the static charge build-up on the fabric surface to dissipate to one-half its original value is measured. In these tests the shorter the time required for dissipation of one-half the static charge build-up ($t^{1/2}$), the greater the degree of antistatic property.

EXAMPLE 1

This example illustrates the preparation of conventional polyhexamethylene adipamide (nylon 66) fiber.

To a stainless steel, high pressure autoclave was added 150 parts of hexamethylene diammonium adipate and 50 parts of water. The autoclave was equipped with stirring means to permit the contents to be agitated. The autoclave was purged of oxygen by use of purified nitrogen and the temperature and pressure were slowly raised until values of 243° C. and 250 p.s.i.g. were reached. During this time steam was continuously removed from the autoclave as a condensate. The pressure was then gradually reduced to atmospheric over a 25 minute period. The polymer was then permitted to equilibrate for 30 minutes at 278° C. The finished polymer was melt spun directly from the bottom of the autoclave through a 13-hole spinneret to yield white multifilament yarn. The yarn was drawn at a draw ratio of 4.70:1 and possessed a tenacity of 5.3 grams per denier. The yarn was later converted to knit fabric suitable for static testing.

EXAMPLE 2

Four yarns were made according to the procedure of Example 1, except that in each instance a compound or mixture of compounds were blended into the nylon melt during the 30 minute equilibrium cycle. The particular compound or mixture of compounds and the amount thereof blended into the nylon are specified in Table I, wherein percent is percent by weight, based on the weight of nylon.

TABLE I

| Yarn sample No. | MDP,[1] percent | PEC,[2] percent | Heat stabilizer,[3] percent |
|---|---|---|---|
| 1 | | 6 | 1.67 |
| 2 | 3 | | |
| 3 | 3 | 6 | 1.67 |
| 4 | 6 | 6 | 1.67 |

[1] Methyltrioctylphosphonium dimethylphosphate.
[2] Hydrogenated castor oil polyethoxylated with 200 moles of ethylene oxide per mole of castor oil.
[3] Tetra-ester of pentaerythritol with 3(3′,5′-ditert. butyl-Δ′-hydroxyphenyl)propionic acid.

EXAMPLE 3

A sample of each of the yarns prepared in Examples 1 and 2 was plied with a similar fiber glass yarn and knitted into five fabrics suitable for flammability testing and tested in the manner described hereinbefore. The average time required for the weight attached to the upper edge of each set of test fabrics to fall (average burning time) is given in Table II.

TABLE II

| Test fabric knitted from yarn sample No. (Example 1) control | Nylon 66 Average burning time, seconds |
|---|---|
| Example: | |
| 2 (Yarn No. 1) (no MDP-6% PEC) | 24.8 |
| 2 (Yarn No. 2) (3% MDP-no PEC) | 33.7 |
| 2 (Yarn No. 3) (3% MDP-6% PEC) | 43.7 |
| 2 (Yarn No. 4) (6% MDP-6% PEC) | 58.0 |

The results show that yarn containing only MDP has flammability properties substantially the same as yarn containing no additives and that yarn containing only PEC (plus heat stabilizer) has flammability properties noticeably inferior to yarn containing no additives, whereas yarn containing a mixture of MDP and PEC (plus heat stabilizer) possess flammability properties substantially superior to any of the above-mentioned yarns. The heat stabilizer has no flame retardant characteristics and is merely added to provide a whiter yarn.

EXAMPLE 4

A sample of each of the yarns of Examples 1 and 2 was knitted into a tubular fabric and tested for antistatic properties in the manner described hereinbefore. The results of the test are given in Table III.

TABLE III

| | Average static half-life, seconds | | |
|---|---|---|---|
| Sample No. | 5 washes/ 4 rinses | 20 washes/ 7 rinses | 20 washes/ 20 rinses |
| Example: | | | |
| 1 (Control) | 600 | 600 | 600 |
| 2 (Yarn No. 1) | 152 | 114 | 88.2 |
| 2 (Yarn No. 2) | | | 78 |
| 2 (Yarn No. 3) | 2.3 | 20.4 | 17 |
| 2 (Yarn No. 4) | 2 | 24.8 | 8.2 |

The results in Table III show that the antistatic properties of the yarn are considerably improved by incorporating into the yarn a mixture of MDP and PEC (Ex. 2— Yarn No. 3 and No. 4) rather than either MDP or PEC singly.

EXAMPLE 5

Tests were carried out to determine and compare the heat stability of the yarns of Examples 1 and 2. The tests were carried out by measuring the yellowness index before and after a sample of each of the yarns was heated in an oven for 15 minutes at 188° C. Additionally, the tenacity of each yarn was determined before and after heating. The change in the index (percent ΔY.I.) and the percent tenacity retention are given in Table IV.

TABLE IV

| Yarn | Percent ΔY.I. | Percent tenacity retention |
|---|---|---|
| Example: | | |
| 1 | 204 | 66.5 |
| 2, Yarn No. 1 | 315 | 37 |
| 2, Yarn No. 2 | | |
| 2, Yarn No. 3 | 185 | 72 |
| 2, Yarn No. 4 | 194 | 80 |

The results in Table IV show that the alkyl phosphonium phosphate imparts heat stability and strength to yarns containing PEC.

As evidenced by the foregoing examples, the incorporation of a mixture consisting of an alkyl phosphonium phosphate of Formula I and a polyalkoxylated compound into a fiber-forming synthetic thermoplastic polymer provides a polymer which can be shaped into articles, such as filaments, having good flame retardant and antistatic properties in addition to thermal stability and strength.

Thermoplastic polymers which may be used in practicing the invention include polyamides, polyvinyl chlorides, polystyrenes and the like. Polycarbonamides are particularly preferred since they are widely used in textile fabrics and carpets and are often modified with a polyalkoxylated compound to improve the antistatic properties thereof. Polycarbonamides are well known in the art and in general are formed by reacting substantially equimolar proportions of a dicarboxylic acid or acids and a diamine or diamines or amide-forming derivatives of the acid and/or diamine. Also, they are prepared by polymerization of an amino acid or lactam or an amide-forming derivative thereof, for example, epsilon-caprolactam or 1-amino-6-hexanoic acid. The polycarbonamides may be characterized as being composed of recurring amide units

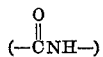
(—CNH—)

wherein the units are separated from one another by at least two carbon atoms. Typical examples of a polycarbonamide include, polyhexamethylene adipamide, terpolymer of 50 mole percent hexamethylene diamine and 50 mole percent of a mixture of adipic acid and terephthalic acid, polymer of dodecanedioic acid and 1,4-cyclohexane-bis(methylamine), polycaprolactam, polyhexamethylene sebacamide, and the like.

The preferred alkyl phosphonium phosphates described by Formula I for use in practicing the invention are those wherein R and R' are each alkyl groups having from 1 to 12 carbon atoms. Representative phosphates include methyltrioctylphosphonium dimethylphosphate, ethyltrioctylphosphonium dibutylphosphate, methyltrinonylphosphonium diethylphosphate, methyltridecanylphosphonium dimethylphosphate, methyltridecanylphosphonium dimethylphosphate, methyltridodecanylphosphonium diethylphosphate, methyltriethylphosphonium dioctylphosphate and the like.

As described previously, suitable polyalkoxylated compounds for use in practicing the invention are those wherein the molecule thereof is composed of at least 50 mole percent of the recurring —OR"— unit, wherein R" is an alkylene group having from 2 to 4 carbon atoms. These compounds are well known in the art and are formed by reacting, for example, a compound having at least one hydroxy group or reactive hydrogen with an alkylene oxide. Generally, ethylene oxide is employed because of the availability thereof. However, propylene oxide can be used effectively or a mixture of propylene oxide and ethylene oxide can be used. Examples of suitable polyalkoxylated compounds include the following.

(A)

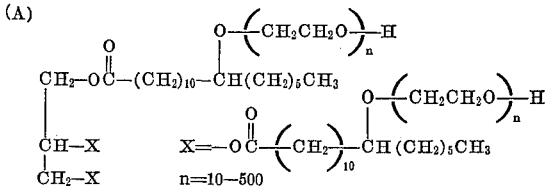

polyethoxylated (hydrogenated) castor oil.

(B) Poly(ethylene ether) glycols having a molecular weight between 1000 and 30,000.

(C) Polyethoxylated dialkylamines (e.g. distearylamine) containing from 15 to 200 —CH$_2$CH$_2$O— units.

(D) Polyethoxylated alkylamines (stearylamine) containing from 15 to 400 —CH$_2$CH$_2$O— units.

(E) Polyethoxylated n-alkylalcohols having from 8 to 30 carbon atoms containing from 8 to 100 —CH$_2$CH$_2$O— units, e.g., polyethoxylated lauryl alcohol.

The polyalkoxylated compound and the phosphate of Formula I may be added to the molten polymer separately or as a mixture. Generally, amounts ranging from 2% to 15% by weight, based on the weight of the polymer, of each of the polyalkoxylated compound and the phosphate provide beneficial results. Preferably, from 2% to 10% of each compound is used.

In addition to the polyalkoxylated compound and phosphate other additives may be added to the polymer to improve its properties, e.g., delustrants, viscosity and heat stabilizers, etc.

What is claimed is:

1. A polymer composition comprising a linear, fiber-forming, synthetic thermoplastic polymer containing uniformly dispersed therein (A) from 2 to 15% by weight of the polymer of a polyalkoxylated compound wherein at least 50 mole percent of the compound is composed of recurring —OR"— units in which R" is a C$_2$ to C$_4$-alkylene group and (B) from 2 to 15% by weight of the polymer of a phosphate of the formula

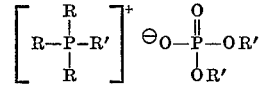

wherein each R and R' is an alkyl group having from 1 to 20 carbon atoms.

2. The composition of claim 1 wherein said polymer is a polycarbonamide.

3. The composition of claim 2 wherein the polyamide is polyhexamethylene adipamide.

4. The composition of claim 3 wherein said polyalkoxylated compound is polyethoxylated (hydrogenated) castor oil.

5. The composition of claim 3 wherein said polyalkoxylated compound is a polyalkoxylated dialkylamine having from 8 to 20 carbon atoms.

6. The composition of claim 3 wherein said polyalkoxylated compound is a poly(alkylene ether) glycol having a molecular weight between 1000 and 30,000.

7. A filament formed from the composition of claim 2.
8. A filament formed from the composition of claim 4.
9. A filament formed from the composition of claim 5.
10. A filament formed from the composition of claim 6.

References Cited

UNITED STATES PATENTS

| | | | |
|---|---|---|---|
| 3,477,986 | 11/1969 | Hermann et al. | 260—45.7 |
| 3,560,419 | 2/1971 | Crovatt | 260—18 |
| 3,322,861 | 5/1967 | Gilham et al. | 260—45.7 |
| 3,530,164 | 9/1970 | Gilham et al. | 260—45.7 |

DONALD E. CZAJA, Primary Examiner

E. C. RZUCIDLO, Assistant Examiner

U.S. Cl. X.R.

260—45.7 P, DIGEST #19, DIGEST #21